(12) United States Patent
Choi et al.

(10) Patent No.: US 12,451,484 B2
(45) Date of Patent: Oct. 21, 2025

(54) POSITIVE ELECTRODE ACTIVE MATERIAL FOR LITHIUM SECONDARY BATTERY, METHOD FOR PREPARING THE SAME, AND LITHIUM SECONDARY BATTERY INCLUDING THE SAME

(71) Applicant: ECOPRO BM CO., LTD., Cheongju-si (KR)

(72) Inventors: Moon Ho Choi, Cheongju-si (KR); Gyeong Jae Heo, Cheongju-si (KR); Seung Hyun Choi, Cheongju-si (KR); A Reum Yang, Cheongju-si (KR); Ju Kyoung Kang, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 0 days.

(21) Appl. No.: 17/072,721

(22) Filed: Oct. 16, 2020

(65) Prior Publication Data
US 2021/0119208 A1    Apr. 22, 2021

(30) Foreign Application Priority Data

Oct. 18, 2019 (KR) .................. 10-2019-0130033
Apr. 27, 2020 (KR) .................. 10-2020-0051074

(51) Int. Cl.
*H01M 4/525* (2010.01)
*H01M 4/02* (2006.01)
(Continued)

(52) U.S. Cl.
CPC ......... *H01M 4/525* (2013.01); *H01M 4/0471* (2013.01); *H01M 4/131* (2013.01);
(Continued)

(58) Field of Classification Search
CPC .... H01M 4/525; H01M 4/0471; H01M 4/131; H01M 4/134; H01M 4/1391;
(Continued)

(56) References Cited

U.S. PATENT DOCUMENTS

| 2004/0018429 A1 | 1/2004 | Kweon et al. |
| 2006/0188781 A1 | 8/2006 | Thackeray et al. |

(Continued)

FOREIGN PATENT DOCUMENTS

| CN | 102056844 A | 5/2011 |
| CN | 104507865 A | 4/2015 |

(Continued)

OTHER PUBLICATIONS

Third Party Observation dated Sep. 19, 2023 in European Application No. 20202300.8.
(Continued)

*Primary Examiner* — Matthew J Merkling
(74) *Attorney, Agent, or Firm* — SALIWANCHIK, LLOYD & EISENSCHENK

(57) ABSTRACT

The present disclosure is related to a positive electrode active material for lithium secondary batteries, a method for preparing the positive electrode active material, and a lithium secondary battery including the positive electrode active material. The positive electrode active material for lithium secondary batteries includes an overlithiated layered oxide (OLO), and the overlithiated layered oxide includes primary particles having a size in a range of 300 nm to 10 μm in an amount ranging from 50 to 100% by volume with respect to the total overlithiated layered oxide.

10 Claims, 11 Drawing Sheets

(51) Int. Cl.
*H01M 4/04* (2006.01)
*H01M 4/131* (2010.01)
*H01M 4/134* (2010.01)
*H01M 4/1391* (2010.01)
*H01M 4/1395* (2010.01)
*H01M 4/36* (2006.01)
*H01M 4/505* (2010.01)
*H01M 10/052* (2010.01)

(52) U.S. Cl.
CPC ......... *H01M 4/134* (2013.01); *H01M 4/1391* (2013.01); *H01M 4/1395* (2013.01); *H01M 4/364* (2013.01); *H01M 4/366* (2013.01); *H01M 4/505* (2013.01); *H01M 10/052* (2013.01); *C01P 2002/52* (2013.01); *C01P 2002/74* (2013.01); *C01P 2004/50* (2013.01); *C01P 2004/61* (2013.01); *C01P 2006/10* (2013.01); *C01P 2006/12* (2013.01); *H01M 2004/021* (2013.01); *H01M 2004/028* (2013.01)

(58) Field of Classification Search
CPC .... H01M 4/1395; H01M 4/364; H01M 4/366; H01M 4/505; H01M 2004/021; H01M 2004/028
See application file for complete search history.

(56) References Cited

U.S. PATENT DOCUMENTS

| | | | |
|---|---|---|---|
| 2010/0308278 A1 | 12/2010 | Kepler et al. | |
| 2011/0052981 A1 | 3/2011 | Lopez et al. | |
| 2012/0064411 A1 | 3/2012 | Lee et al. | |
| 2014/0045067 A1 | 2/2014 | Cho et al. | |
| 2014/0087263 A1 | 3/2014 | Matsumoto et al. | |
| 2014/0106222 A1 | 4/2014 | Park et al. | |
| 2014/0131616 A1 | 5/2014 | Sun et al. | |
| 2014/0141331 A1* | 5/2014 | Lee | H01M 4/364 429/223 |
| 2014/0162126 A1* | 6/2014 | Cho | C01G 53/006 252/182.1 |
| 2014/0162127 A1* | 6/2014 | Kim | H01M 4/582 427/126.3 |
| 2014/0242468 A1* | 8/2014 | Song | H01M 4/505 429/231.1 |
| 2015/0030928 A1 | 1/2015 | Kwak et al. | |
| 2015/0325846 A1* | 11/2015 | Kitagawa | H01M 4/587 429/231.1 |
| 2016/0181605 A1* | 6/2016 | Li | H01M 4/525 252/182.1 |
| 2016/0190555 A1* | 6/2016 | Kapylou | H01M 4/131 429/217 |
| 2016/0254539 A1* | 9/2016 | Kagei | H01M 4/525 252/182.1 |
| 2017/0012284 A1 | 1/2017 | Bugga et al. | |
| 2017/0133676 A1* | 5/2017 | Kodato | H01M 4/366 |
| 2018/0323435 A1 | 11/2018 | Lim et al. | |
| 2019/0074512 A1 | 3/2019 | Choi et al. | |
| 2019/0341609 A1* | 11/2019 | Endo | H01M 4/505 |
| 2020/0161650 A1 | 5/2020 | Park et al. | |
| 2020/0303720 A1* | 9/2020 | Jo | H01M 4/525 |
| 2020/0313157 A1* | 10/2020 | Johnson | H01M 4/505 |
| 2021/0226205 A1 | 7/2021 | Park et al. | |
| 2022/0388864 A1 | 12/2022 | Choi et al. | |
| 2022/0393153 A1 | 12/2022 | Choi et al. | |
| 2022/0411282 A1 | 12/2022 | Choi et al. | |

FOREIGN PATENT DOCUMENTS

| | | | | |
|---|---|---|---|---|
| CN | 104617304 A | 5/2015 | | |
| CN | 104979554 A | 10/2015 | | |
| CN | 105470493 A | 4/2016 | | |
| CN | 105612124 A | 5/2016 | | |
| CN | 106797049 A | 5/2017 | | |
| CN | 108172773 A | 6/2018 | | |
| CN | 108886144 A | 11/2018 | | |
| EP | 2763220 A2 * | 8/2014 | | C01D 15/02 |
| EP | 3819262 A1 | 5/2021 | | |
| JP | 1998069910 A | 3/1998 | | |
| JP | 2005251716 A | 9/2005 | | |
| JP | 2006012426 A | 1/2006 | | |
| JP | 2011070789 A | 4/2011 | | |
| JP | 2011171113 A | 9/2011 | | |
| JP | 2012138352 A | 7/2012 | | |
| JP | 2012190772 A | 10/2012 | | |
| JP | 2014041720 A | 3/2014 | | |
| JP | 2014513392 A | 5/2014 | | |
| JP | 2014222607 A | 11/2014 | | |
| JP | 2015122235 A | 7/2015 | | |
| JP | 2015130273 A | 7/2015 | | |
| JP | 2016139569 A | 8/2016 | | |
| JP | 2017010841 A | 1/2017 | | |
| JP | 2018508929 A | 3/2018 | | |
| JP | 6315404 B2 | 4/2018 | | |
| JP | 2019091692 A | 6/2019 | | |
| KR | 20120089845 A | 8/2012 | | |
| KR | 20130001703 A | 1/2013 | | |
| KR | 10-2013-0058590 A | 6/2013 | | |
| KR | 20130117338 A | 10/2013 | | |
| KR | 20140025102 A | 3/2014 | | |
| KR | 20140048456 A | 4/2014 | | |
| KR | 20150014884 A | 2/2015 | | |
| KR | 101520634 B1 | 5/2015 | | |
| KR | 20150145736 A | 12/2015 | | |
| KR | 20160032246 A | 3/2016 | | |
| KR | 20160039983 A | 4/2016 | | |
| KR | 20160123406 A | 10/2016 | | |
| KR | 10-2017-0063387 A | 6/2017 | | |
| KR | 20170080104 A | 7/2017 | | |
| KR | 20190008156 A | 1/2019 | | |
| KR | 20190046617 A | 5/2019 | | |
| KR | 20190110551 A | 9/2019 | | |
| WO | 2011031546 A2 | 3/2011 | | |
| WO | 2013002457 A1 | 1/2013 | | |
| WO | 2015053357 A1 | 4/2015 | | |
| WO | 2016053056 A1 | 4/2016 | | |
| WO | WO-2017051338 A1 * | 3/2017 | | C01G 51/44 |
| WO | 2018038037 A1 | 3/2018 | | |
| WO | 2018043669 A1 | 3/2018 | | |
| WO | 2018137942 A1 | 8/2018 | | |

OTHER PUBLICATIONS

Office Action dated Sep. 19, 2023 in Chinese Application No. 202011109592.2.
Third Party Observation dated Nov. 8, 2023 in European Application No. 20202300.8.
Li, X. et al. "Effect of niobium doping on the microstructure and electrochemical properties of lithium-rich layered Li [Li0.2Ni0.2Mn0.6]O2 as cathode materials for lithium ion batteries" RSC Adv., 2015, 5:45351-45358.
Extended European Search Report dated Nov. 17, 2023 in European Application No. 20877964.5.
Extended European Search Report dated Nov. 17, 2023 in European Application No. 20877965.2.
Extended European Search Report dated Nov. 23, 2023 in European Application No. 20876679.0.
International Search Report dated Mar. 15, 2021 in International Application No. PCT/KR2020/014281.
International Search Report dated Mar. 8, 2021 in International Application No. PCT/KR2020/014282.
International Search Report dated Feb. 3, 2021 in International Application No. PCT/KR2020/014280.
Office Action dated Apr. 2, 2024 in Japanese Application No. 2022-130624.
Office Action dated Feb. 14, 2022 in Korean Application No. 10-2020-0078294.
Office Action dated Jan. 17, 2024 in Chinese Application No. 202080072959.X.

(56) References Cited

OTHER PUBLICATIONS

Office Action dated Jan. 6, 2024 in Korean Application No. 10-2023-0093098.

Office Action dated Jan. 6, 2024 in Korean Application No. 10-2023-0128987.

Office Action dated Jul. 28, 2023 in Chinese Application No. 202080073047.4.

Office Action dated Jun. 6, 2023 in Chinese Application No. 202080072966.X.

Office Action dated Mar. 1, 2024 in Chinese Application No. 202080073047.4.

Office Action dated Mar. 12, 2024 in Chinese Application No. 202011109592.2.

Office Action dated May 2, 2023 in Japanese Application No. 2022-523166.

Office Action dated May 23, 2023 in Japanese Application No. 2022-523072.

Office Action dated May 23, 2023 in Japanese Application No. 2022-523167.

Office Action dated Nov. 15, 2023 in Korean Application No. 10-2023-0044072.

Office Action dated Nov. 23, 2021 in Korean Application No. 10-2020-0051074.

Office Action dated Oct. 12, 2022 in Korean Application No. 10-2020-0135029.

Office Action dated Oct. 5, 2021 in Japanese Application No. 2020-174737.

Office Action dated Sep. 24, 2022 in Korean Application No. 10-2020-0134483.

Ding, W. "Synthesis and modification of high voltage ternary cathode materials for lithium-ion batteries" Metallurgical Industry Press, Mar. 2019, p. 12.

Ding, Z. et al. "Stable heteroepitaxial interface of Li-rich layered oxide cathodes with enhanced lithium storage" Energy Storage Materials. 2019, vol. 21, pp. 69-76.

Kong, J-Z. et al. "Li-ion-conductive Li2TiO3-coated Li[Li0.2Mn0.51Ni0.19Co0.I]O2 for high-performance cathode material in lithium-ion battery", J Solid State Electrochem, 2016, vol. 20, No. 5, pp. 1435-1443.

Ma, J. et al. "A highly homogeneous nanocoating strategy for Li-rich Mn-based layered oxides based on chemical conversion", Journal of Power Sources, EPUB Dec. 2, 2014, vol. 277, pp. 393-402.

Makhonina, E.V. et al., "Li-rich and Ni-rich transition metal oxides: Coating and core-shell structures," Applied Surface Science, 2019, 474:25-33.

Qiao, Q.Q. et al., "Surface modification of Li-rich layered Li(Li0.17Ni0.25Mn0.58) O2 oxide with Li—Mn—PO4 as the cathode for lithium-ion batteries," Journal of Materials Chemistry A, 2013, 1:5262-5268.

Seu, C.S. et al., "Aluminum Borate Coating on High-Voltage Cathodes for Li-Ion Batteries," Journal of The Electrochemical Society, 2015, 162(12):A2259-A2265.

Wu, F. et al. "Can surface modification be more effective to enhance the electrochemical performance of lithium rich materials?" Journal of Materials Chemistry, 2012, 22:1489-1497.

Wu, Y. et al. "Simultaneous surface coating and chemical activation of the Li-rich solid solution lithium rechargeable cathode and its improved performance", Electrochimica Acta, 2013, vol. 113, pp. 54-62.

Xie, Y. et al. "Improving the rate capability and decelerating the voltage decay of Li-rich layered oxide cathodes by constructing a surface-modified microrod structure," Journal of Alloys and Compounds, 2019, 772:230-239.

Zhang, J. et al. "New insights into the modification mechanism of Li-rich Li1.2Mn0.6Ni0.2O2 coated by Li2ZrO3", Physical Chemistry Chemical Physics, 2016, vol. 18, No. 19, pp. 13322-13331.

Zhao, E. et al. "Facile synthesis and enhanced electrochemical performances of Li2TiO3-coated lithium-rich layered Li1.13Ni0.30Mn0.57O2 cathode materials for lithium-ion batteries", Journal of Power Sources, 2015, vol. 294, pp. 141-149.

Zhao, J. et al. "Tailorable electrochemical performance of spinel cathode materials via in-situ integrating a layered Li2MnO3 phase for lithium-ion batteries," Journal of Power Sources, 2016, 333:43-52.

Zhao, Y. et al. "Surface structural transition induced by gradient A polyanion-doping in Li-rich layered oxides: implications for enhanced electrochemical performance" Advanced Functional Materials. 2016, vol. 26, pp. 4760-4767.

Office Action dated Oct. 15, 2024 in Japanese Application No. 2023-201270.

Longo, R.C. et al. "Core-Shell Nanocomposites for Improving the Structural Stability of Li-Rich Layered Oxide Cathode Materials for Li-Ion Batteries" ACS Appl. Mater. Interfaces, 2018, 10:19226-19234.

Office Action dated Feb. 25, 2025 in Japanese Application No. JP 2023-215143 (with English translation).

Office Action dated Sep. 2, 2025 in Japanese Application No. 2024-107739 (with English translation).

* cited by examiner

POSITIVE ELECTRODE ACTIVE MATERIAL FOR LITHIUM SECONDARY BATTERY, METHOD FOR PREPARING THE SAME, AND LITHIUM SECONDARY BATTERY INCLUDING THE SAME

CROSS-REFERENCE TO RELATED APPLICATIONS

This application claims priority to Korean Application Nos. 10-2019-0130033, filed Oct. 18, 2019; and 10-2020-0051074, filed Apr. 27, 2020; which are hereby incorporated by reference in their entirety.

TECHNICAL FIELD

Embodiments of the present disclosure relate to a positive electrode active material including an overlithiated layered oxide (OLO), and more particularly, to a positive electrode active material for lithium secondary batteries adjusted in terms of size of primary particles due to dopants serving as a flux for growing the primary particles, to a method for preparing the positive electrode active material, and a lithium secondary battery including the positive electrode active material.

DISCUSSION OF RELATED ART

With the development of portable mobile electronic devices such as smartphones, MP3 players, and tablet PCs, the demand for secondary batteries capable of storing electric energy has increased enormously. Particularly, with the advent of electric vehicles, medium- and large-sized energy storage systems, and portable devices requiring high energy density, the demand for lithium secondary batteries is increasing.

A material that has recently attracted attention as a positive electrode active material is a lithium nickel manganese cobalt oxide ($Li(Ni_xCo_yMn_z)O_2$, where x, y, and z each independently are atomic fractions of oxide composition elements, $0<x\leq1$, $0<y\leq1$, $0<z\leq1$, and $0<x+y+z\leq1$). Since this material is used at a higher voltage than $LiCoO_2$, which has been actively studied and used as a positive electrode active material so far, it has the advantage of producing high capacity, and has the advantage of low cost because the Co content is relatively small. However, it has disadvantages of poor rate capability and poor life characteristics at high temperatures.

Accordingly, research is being conducted to apply, to lithium secondary batteries, an overlithiated layered oxide (OLO) which exhibits a high reversible capacity beyond the conventional $Li(Ni_xCo_yMn_z)O_2$.

In this case, however, a voltage decay phenomenon that occurs during life cycling becomes a problem, which arises from a phase transition from a spinel-like structure to a cubic due to migration of transition metals during life cycling. This voltage decay phenomenon is a problem that should be solved for commercialization of lithium secondary batteries. In addition, a low packing density is another problem that should be improved.

DETAILED DESCRIPTION OF THE INVENTION

Technical Objectives

Aspects of embodiments of the present disclosure may be directed to a positive electrode active material for secondary batteries, including an overlithiated layered oxide ("OLO"), that is increased in terms of energy density and reduced in terms of a specific surface area of particles, as compared to a conventional polycrystalline OLO, by adjusting growth of primary particles.

In addition, aspects of embodiments of the present disclosure may be further directed to a dopant material for improving internal structure stability of particles of the positive electrode active material.

Technical Solution to the Problem

According to an embodiment, a positive electrode active material for secondary batteries includes an overlithiated layered oxide (OLO) represented by the following Chemical Formula 1, primary particles are aggregated to form secondary particles, and primary particles having a size in a range of 300 nm to 10 μm may be 50 to 100% by volume of the primary particles constituting the secondary particles.

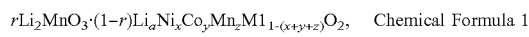
$$rLi_2MnO_3 \cdot (1-r)Li_aNi_xCo_yMn_zM1_{1-(x+y+z)}O_2, \quad \text{Chemical Formula 1}$$

(where $0<r\leq0.6$, $0<a\leq1$, $0\leq x\leq1$, $0\leq y<1$, $0\leq z<1$, $0<x+y+z<1$, and M1 is at least one or more selected from Na, K, Mg, Al, Fe, Cr, Y, Sn, Ti, B, P, Zr, Ru, Nb, W, Ba, Sr, La, Ga, Mg, Gd, Sm, Ca, Ce, Fe, Al, Ta, Mo, Sc, V, Zn, Nb, Cu, In, S, B and Bi).

In some embodiments, in the positive electrode active material, the primary particles may be irregular in shape, and a size of the primary particle may mean a longest length.

In some embodiments, in the positive electrode active material, sizes of the primary particles in a positive electrode active material stage may be greater as compared to sizes of the primary particles in a precursor stage, and a ratio of (size of the primary particles of the positive electrode active material added with dopants)/(size of the primary particles of the positive electrode active material without a dopant) may be 1 or more, preferably 50 or more.

In some embodiments, in the positive electrode active material, primary particles having a size in a range from 1 μm to 2 μm may be included in an amount ranging from 50 to 100% by volume with respect to the total overlithiated layered oxide.

In some embodiments, an average particle diameter of the secondary particles of the positive electrode active material may be in a range from 2 μm to about 20 μm.

In some embodiments, in the positive electrode active material, M1 of Chemical Formula 1 may be a dopant serving as a flux that induces growth of the primary particles in the overlithiated layered oxide.

In some embodiments, in the positive electrode active material, M1 of Chemical Formula 1 may be at least one or more selected from Nb, Ta, Mo, and W, and M1 may be Nb or Ta.

In some embodiments, in the positive electrode active material, M1 may be included in an amount ranging from 0.001 to 10 mol % with respect to the total overlithiated layered oxide.

In some embodiments, in the positive electrode active material, M1 may be Nb, and Nb may be included in an amount ranging from 0.1 to 1 mol % with respect to the total overlithiated layered oxide.

In some embodiments, the positive electrode active material may further include Chemical Formula 2 $Li_aM1O_b$ (where $0<a\leq7$, $0<b\leq15$, and M1 may be at least one or more selected from Ba, Sr, B, P, Y, Zr, Nb, Mo, Ta and W). $Li_aM1O_b$ of Chemical Formula 2 may be a material produced by reacting the dopant that induces the growth between the primary particles with lithium.

In some embodiments, when baked under the same conditions, as the primary particles grow after M1 is included, a full width at half maximum (FWHM (deg.)) of the positive electrode active material at I (104) in XRD analysis may be reduced by a rate ranging from 5 to 50% as compared to a material in which M1 is not included.

In some embodiments, an energy density per volume (Wh/L) of the positive electrode active material may be in a range of 2.7 to 4.0 Wh/L.

In some embodiments, the energy density per volume (Wh/L) of the positive electrode active material may be increased by a rate ranging from 5 to 30% as compared to a material in which M1 is not included.

In some embodiments, a packing density (g/cc) of the positive electrode active material may be in a range of 2.0 to 4.0 g/cc.

In some embodiments, a specific surface area (BET, $m^2/g$) of the positive electrode active material may be in a range of 0.1 to 1.5 (BET, $m^2/g$).

In some embodiments, the specific surface area (BET, $m^2/g$) of the positive electrode active material may be reduced by a rate ranging from 25 to 80% as the primary particles are grown, as compared to a material in which M1 is not included.

In some embodiments, a rate (Li/(Ni+Co+Mn)) of the number of moles of lithium to the total number of moles of at least one or more metal selected from Ni, Co and Mn in the positive electrode active material is in a range of 1.1 to 1.6.

In some embodiments, a rate (Mn/Ni) of the number of moles of Mn to the total number of moles of Ni in the positive electrode active material may be in a range of 1 to 4.5.

In some embodiments, the positive electrode active material may be in a solid solution phase in which $Li_2MnO_3$ having a monoclinic structure and $LiMO_2$ having a rhombohedral structure are mixed, where M may be at least one or more selected from Ni, Co, Mn, and M1.

In some embodiments, in an initial charge/discharge profile of the positive electrode active material, a plateau may appear in a 4.4 V region due to $Li_2MnO_3$.

According to an embodiment, a method for preparing the positive electrode active material includes: preparing a positive electrode active material precursor including at least one or more elements selected from Ni, Co, and Mn; and mixing a lithium compound and a compound containing M1 of the above Chemical Formula 1 in the positive electrode active material precursor and baking the mixture.

In some embodiments, in the method for preparing the positive electrode active material, sizes of the primary particles in a positive electrode active material stage may be greater as compared to sizes of the primary particles in a precursor stage, and a ratio of (size of the primary particles of the positive electrode active material added with dopants)/(size of the primary particles of the positive electrode active material without a dopant) may be 1 or more, preferably 50 or more.

In some embodiments, in the method for preparing the positive electrode active material, a temperature of the baking may be in a range of 750 to 950° C.

In some embodiments, the method for preparing the positive electrode active material may further include roasting the prepared precursor after preparing of the precursor and before performing baking, and a temperature of the roasting may be in a range of 300 to 600° C.

In some embodiments, in the method for preparing the positive electrode active material, M1 may be Nb, and the compound containing Nb may be $Nb_2O_5$.

In some embodiments, the method for preparing the positive electrode active material may further include, after the baking, washing and drying the baked positive electrode active material.

In some embodiments, the method for preparing the positive electrode active material may further include, after the baking, heat-treating the baked positive electrode active material.

According to an embodiment, a secondary battery includes the positive electrode active material.

Effects of Invention

According to one or more embodiments of the present disclosure, a positive electrode active material for secondary batteries, including an overlithiated layered oxide ("OLO"), monocrystallizes primary particles, as compared to a conventional polycrystalline OLO positive electrode active material, by including a dopant material for improving internal structure stability of particles of the positive electrode active material, and thus a packing density as well as an energy density are improved, and a specific surface area is reduced.

In addition, since the specific surface area of the secondary battery including the positive electrode active material is reduced, as compared to the case where the conventional polycrystalline OLO positive electrode active material is used, a surface portion of the positive electrode active material is reduced, and thus life and voltage decay problems are significantly reduced.

MODES FOR CARRYING OUT THE INVENTION

Figure 1:
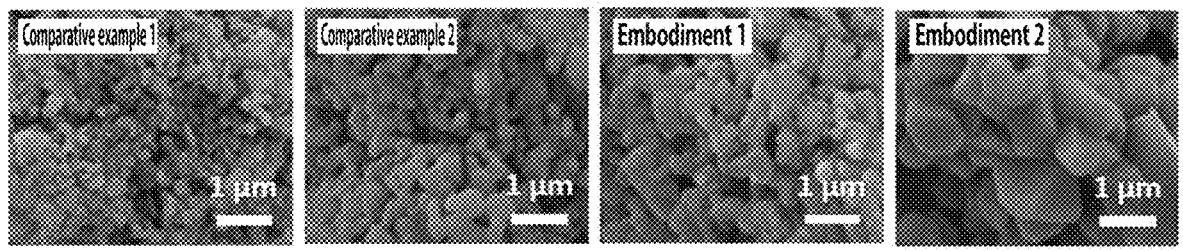
FIG. 1 illustrates SEM analysis images of positive electrode active materials according to Comparative Examples and Embodiments.

Throughout the present disclosure, terms such as "comprising" and "including" as used herein are to be understood as open-ended terms with the possibility of including other embodiments.

In addition, terms "preferable" and "preferably" as used herein refer to embodiments of the present disclosure that may provide certain advantages under certain circumstances and are not intended to exclude other embodiments from the scope of the present disclosure.

Hereinafter, a positive electrode active material according to an embodiment will be described in detail.

A positive electrode active material according to an embodiment includes an overlithiated layered oxide ("OLO").

The overlithiated layered oxide may be in a solid solution phase in which $Li_2MnO_3$ having a monoclinic structure and $LiMO_2$ having a rhombohedral structure are mixed, where M is at least one or more selected from Ni, Co, Mn, and M1.

In addition, the overlithiated layered oxide according to an embodiment may show a plateau in a 4.4 V region of an initial charge/discharge profile due to $Li_2MnO_3$. In an initial charge process of the overlithiated layered oxide according to an embodiment, a $Li_2MnO_3$ phase is in an electrochemically inactive state up to the 4.4 V region, and oxygen evolution and a reaction whereby lithium is desorbed from the $Li_2MnO_3$ phase occur at 4.4 V or higher.

The overlithiated layered oxide according to an embodiment is represented by the following Chemical Formula 1:

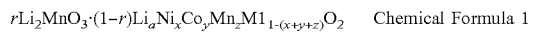

$rLi_2MnO_3 \cdot (1-r)Li_aNi_xCo_yMn_zM1_{1-(x+y+z)}O_2$  Chemical Formula 1

(where $0<r\leq0.6$, $0<a\leq1$, $0\leq x\leq1$, $0\leq y<1$, $0\leq z<1$, $0<x+y+z<1$, and M1 is at least one or more selected from Na, K, Mg, Al, Fe, Cr, Y, Sn, Ti, B, P, Zr, Ru, Nb, W, Ba, Sr, La, Ga, Mg, Gd, Sm, Ca, Ce, Fe, Al, Ta, Mo, Sc, V, Zn, Nb, Cu, In, S, B and Bi).

A rate (Li/(Ni+Co+Mn)) of the number of moles of lithium to the total number of moles of at least one or more metal selected from Ni, Co and Mn included in the overlithiated layered oxide represented by Chemical Formula 1 may be in a range of 1.1 to 1.6, 1.2 to 1.6, 1.2 to 1.5, 1.2 to 1.4, or 1.2 to 1.3.

In Chemical Formula 1, a value of x may be in a range of greater than 0 to 0.5, greater than 0 to 0.4, greater than 0 to 0.3, greater than 0 to 0.2, or greater than 0 to 0.1.

In Chemical Formula 1, a value of y may be in a range of greater than 0 to 0.5, greater than 0 to 0.4, greater than 0 to 0.3, greater than 0 to 0.2, or greater than 0 to 0.1.

In addition, a rate (Mn/Ni) of the number of moles of Mn to the total number of moles of Ni may be in a range of 1 to 4.5, 1 to 4, 2 to 4.5, 2 to 4, 3 to 4.5, or 3 to 4.

The positive electrode active material according to an embodiment is an oxide rich in lithium and manganese, and by adjusting a rate of the content of Mn and Li and a grain boundary density to a predetermined range, problems such as density and voltage decay may be more efficiently improved.

The oxide according to an embodiment may have a layered structure in which a lithium atom layer and a metal atom layer of Ni, Co, Mn, or M1 are alternately overlapped through an oxygen atom layer.

A surface that forms a layer of the layered structure of the positive electrode active material may have crystal orientation in a direction perpendicular to a C-axis. In such a case, mobility of lithium ions contained in the positive electrode active material may be improved, and structural stability of the positive electrode active material may be improved, thereby improving initial capacity characteristics, output characteristics, resistance characteristics, and long-term life characteristics when the positive electrode active material is applied to batteries.

In addition, as an embodiment, the positive electrode active material including the lithium-overlithiated layered oxide according to an embodiment may have a single-crystal structure.

In the positive electrode active material according to an embodiment, primary particles may be aggregated to form secondary particles, and sizes of the primary particles may be in a range of 0.01 to 10 µm.

In an embodiment, the positive electrode active material may be adjusted so that primary particles having a size in a range of 300 nm to 5 µm are in an amount ranging from 50 to 100% by volume, ranging from 70 to 100% by volume, or of 100% by volume of the primary particles constituting the secondary particles.

In an embodiment, the positive electrode active material may be adjusted so that primary particles having a size in a range of 300 nm to 10 µm are in an amount ranging from 50 to 100% by volume, ranging from 70 to 100% by volume, or of 100% by volume of the primary particles constituting the secondary particles.

In an example, the positive electrode active material may be adjusted so that primary particles having a size in a range of greater than 500 nm to 10 µm are in an amount ranging from 50 to 100% by volume, ranging from 70 to 100% by volume, or of 100% by volume of the primary particles constituting the secondary particles.

In an example, the positive electrode active material may be adjusted so that primary particles having a size in a range of 1 µm to 2 µm are in an amount ranging from 50 to 100% by volume of the total primary particles constituting the secondary particles.

In an example, the positive electrode active material may be adjusted so that primary particles having a size in a range of 1 µm to 10 µm are in an amount ranging from 50 to 100% by volume, ranging from 70 to 100% by volume, or of 100% by volume with respect to the total overlithiated layered oxide.

In an example, the positive electrode active material may be adjusted so that primary particles having a size greater than 1 µm are in an amount ranging from 50 to 100% by volume, ranging from 70 to 100% by volume, or of 100% by volume with respect to the total overlithiated layered oxide.

In an example, the positive electrode active material may be adjusted so that primary particles having a size of 2 µm or greater are in an amount ranging from 50 to 100% by volume or 50 to less than 70% by volume with respect to the total overlithiated layered oxide.

As used herein, the size of the primary particle means a longest length of the particle.

In addition, in an example, an average particle diameter of the primary particles of the positive electrode active material may be adjusted to be in a range of greater than 500 nm to 10 or 1 μm to 10 μm.

As used herein, the average particle diameter may be defined as a particle diameter corresponding to 50% of a cumulative volume in the particle diameter distribution curve of the particles. The average particle diameter may be measured using, for example, a laser diffraction method.

In an embodiment of the present disclosure, as the positive electrode active material is adjusted to form a single crystal structure by increasing the size of the primary particles in the overlithiated layered oxide, when baked under the same conditions, a full width at half maximum (FWHM (deg.)) at I (104) in XRD analysis may be adjusted to be reduced by a rate ranging from 5 to 25%, 5 to 20%, 10 to 25%, or 10 to 20% in a case where M1 is included as compared to comparative examples in which M1 is not included.

In addition, as the positive electrode active material is adjusted to form a single crystal structure by increasing the size of the primary particles in the overlithiated layered oxide, an energy density per volume (Wh/L) may be adjusted to be increased by a rate ranging from 5 to 25%, 5 to 20%, 10 to 25%, or 10 to 20% in a case where M1 is included as compared to comparative examples in which M1 is not included.

In addition, as the positive electrode active material is adjusted to form a single crystal structure by increasing the size of the primary particles in the overlithiated layered oxide, a specific surface area (BET, m$^2$/g) may be adjusted to be reduced by a rate ranging from 20 to 80% in a case where M1 is included as compared to comparative examples in which M1 is not included.

The conventional overlithiated layered oxide has a problem of voltage decay during cycling. The voltage decay arises from a phase transition from a spinel-like structure to a cubic due to migration of transition metals during life cycling, and this phenomenon mainly occurs from a surface portion of the positive electrode active material. According to some embodiments of the present disclosure, the positive electrode active material is adjusted to have a single crystal structure by inducing growth of the primary particles, thereby increasing the energy density per volume and reducing the specific surface area, and accordingly, the problem of life and voltage decay may be addressed. In the present disclosure, inducing the growth of the primary particles includes all concepts of nucleation and ostwald ripening and particle aggregation.

In addition, by reducing the specific surface area, it is possible to solve the problem of side reactions with an electrolyte.

In the positive electrode active material according to an embodiment, as portions corresponding to the single crystal structure increases, the problem of voltage decay that may occur in polycrystals may be improved.

The positive electrode active material according to an embodiment includes M1 of Chemical Formula 1 as a dopant for inducing the growth between the primary particles. More preferably, M1 may be doped into a lattice structure as a dopant serving as a flux that induces the growth between the primary particles in the overlithiated layered oxide. In an embodiment, by adding the flux dopant in a lithium compound to be mixed in the baking and subject to heat treatment together, the size of the primary particles may be increased. The meaning of "serving as a flux" means that it may serve as a dopant to increase the size of the primary particles by growth between the primary particles.

M1 is at least one or more selected from Na, K, Mg, Al, Fe, Cr, Y, Sn, Ti, B, P, Zr, Ru, Nb, W, Ba, Sr, La, Ga, Mg, Gd, Sm, Ca, Ce, Fe, Al, Ta, Mo, Sc, V, Zn, Nb, Cu, In, S, B and Bi, more preferably, at least one or more selected from Ba, Sr, B, P, Y, Zr, Nb, Mo, Ta and W which may more suitably adjust the size of the primary particles to grow more in a specific range, and most preferably, at least one or more selected from Nb and Ta.

In the positive electrode active material according to an embodiment, when the dopant element that induces the growth between the primary particles is mixed with the lithium compound in the baking and heat-treated together, the life and voltage decay problems may be improved as the specific surface portion of the positive electrode active material is reduced.

The positive electrode active material according to an embodiment may uniformly include the dopant elements on a surface and inside of the positive electrode active material, such that structural stability of the positive electrode active material may be improved, thereby improving life characteristics and thermal stability.

In the positive electrode active material according to an embodiment, M1 may be included in an amount ranging from 0.01 to 3 mol % with respect to the total overlithiated layered oxide. In addition, it may be included in an amount ranging from 0.1 to 2 mol %, and more preferably, 0.1 to 1 mol %. If the dopant M1 included as the flux for inducing the growth of the primary particles is in an amount exceeding the above range, a lithium composite oxide may be formed excessively, causing a decrease in capacity and efficiency, and if the dopant M1 is in an amount less than the above range, the effect of growing the primary particles may be insufficient.

In an embodiment of the present disclosure, the positive electrode active material for secondary batteries may further include an overlithiated layered oxide represented by the following Chemical Formula 2:

$Li_aM1O_b$          Chemical Formula 2

(where 0<a≤7, 0<b≤15, and M1 is at least one or more selected from Ba, Sr, B, P, Y, Zr, Nb, Mo, Ta and W).

$Li_aM1O_b$ of Chemical Formula 2 may be a material produced by reaction of a dopant that induces growth between primary particles with lithium.

In XRD analysis of the positive electrode active material according to an embodiment, a full width at half maximum (FWHM (deg.)) at I (104) may be in a range of 0.1 to 0.25 deg., but the value may vary depending on a manganese content. Accordingly, by adjusting a reduction rate of the FWHM through addition and content control of the dopant M1, problems of life and voltage decay may be solved.

In an embodiment, an energy density per volume (Wh/L) of the positive electrode active material adjusted through addition and content control of the dopant M1 may be in a range of 2.7 to 4.0 Wh/L.

In an embodiment, a specific surface area (BET, m$^2$/g) of the positive electrode active material adjusted through addition and content control of the dopant M1 may be in a range of 0.01 to 2 (BET, m$^2$/g).

An average particle diameter of the positive electrode active material particles according to an embodiment may be in a range of 0.1 to 30 μm, or 0.1 to 25 μm, or 0.1 to 20 μm, or 0.1 to 15 μm, or 0.1 to 10 μm.

The positive electrode active material including the overlithiated layered oxide according to an embodiment may have a structure in which primary particles are grown to form secondary particles.

In an embodiment, the positive electrode active material particles may have a fiber, membrane, or spherical shape, and more preferably a spherical shape.

As used herein, the average particle diameter may be defined as a particle diameter corresponding to 50% of a cumulative volume in the particle diameter distribution curve of the particles. The average particle diameter may be measured using, for example, a laser diffraction method.

In addition, the primary particle may be a rod, a plate, a sphere, an ellipse, a disk, or irregular in shape. Preferably, the shape of the primary particle may be at least one or more of a plate shape or an irregular shape.

In the positive electrode active material according to an embodiment, the size of the primary particles is adjusted such that the number of the primary particles in the secondary particles may be adjusted to be in a range of 1 to 10,000, 1 to 1,000, 1 to 100, and 1 to 10.

The positive electrode active material according to an embodiment may further include a coating layer.

The coating layer may include at least one or more of a coating material selected from P, Nb, Si, Sn, Al, Pr, Al, Ti, Zr, Fe, Al, Fe, Co, Ca, Mn, Ti, Sm, Zr, Fe, La, Ce, Pr, Mg, Bi, Li, W, Co, Zr, B, Ba, F, K, Na, V, Ge, Ga, As, Sr, Y, Ta, Cr, Mo, W, Mn, Ir, Ni, Zn, In, Na, K, Rb, Cs, Fr, Sc, Cu, Ru, Rh, Pd, Ag, Cd, Sb, Hf, Ta, Re, Os, Pt, Au, Pb, Bi, and Po, but the material of the coating layer is not particularly limited thereto.

The coating layer blocks contact between the positive electrode active material and an electrolyte contained in a lithium secondary battery to mitigate occurrence of side reactions, thereby improving life characteristics and increasing packing density, and it may act as a lithium ion conductor depending on the coating layer.

In an embodiment, the coating layer may be formed between grain boundaries of the primary particles.

In an embodiment, a thickness of the coating layer may be in a range of 0.1 to 500 nm.

The coating layer may be formed over an entire surface of the positive electrode active material or may be partially formed.

In an embodiment, the coating layer may be in the form of a single-layer coating, a double-layer coating, a grain boundary coating, a uniform coating, or an island coating.

In the positive electrode active material containing the overlithiated layered oxide according to an embodiment, the positive electrode active material may include a concentration gradient portion in which a concentration of at least one of Ni, Co, Mn, and M1 shows concentration gradient.

In the positive electrode active material according to an embodiment, a lithium ion diffusion path may be formed in the primary particles.

In the positive electrode active material according to an embodiment, a surface that forms a layer of the layered structure of the positive electrode active material may have crystal orientation in a direction perpendicular to a C-axis in the primary particle, and the lithium ion diffusion path may be formed inside or outside of the primary particles in a direction toward a center of the positive electrode active material.

Hereinafter, a method for preparing a positive electrode active material according to an embodiment will be described in detail.

The method for preparing the positive electrode active material for secondary batteries according to an embodiment includes preparing a positive electrode active material precursor including at least one or more elements selected from Ni, Co, and Mn.

In order to prepare the precursor, as a raw material of nickel, cobalt, manganese, and dopants, sulfates, nitrates, acetates, halides, hydroxides, or oxyhydroxides containing each metal element may be used, and any material that is soluble in a solvent such as water may be used without particular limitation.

In addition, in order to prepare the precursor, co-precipitation, spray-drying, solid state scheme, wet pulverization, fluidized bed drying scheme, or vibration drying scheme may be used.

The method for preparing the positive electrode active material for secondary batteries according to an embodiment includes mixing a lithium compound and a compound containing M1 of Chemical Formula 1, which is a dopant included as a flux for inducing growth between primary particles, with the prepared positive electrode active material precursor, followed by baking.

In embodiments, as the primary particles grow through addition of flux dopants, e.g., dopant M1 included as fluxes for inducing growth between the primary particles, into the lithium compound in the baking, the specific surface area of the positive electrode active material is reduced, thus addressing problems in life and voltage decay.

In the method for preparing a positive electrode active material for secondary batteries according to an embodiment, the lithium compound may use a lithium-containing sulfate, nitrate, acetate, carbonate, oxalate, citrate, halide, hydroxide, oxyhydroxide, or the like, but embodiments are not particularly limited thereto.

In an embodiment, a temperature of the baking may be in a range of 750 to 950° C., 800 to 950° C., or 850 to 950° C.

In addition, after preparing of the precursor and before baking to be described below, the method may further include roasting the fabricated precursor, a temperature of the roasting may be in a range of 300 to 600° C., 400 to 600° C., or 500 to 600° C.

The roasting of the precursor may be performed by repeating heating and maintaining of the temperature or in the order of heating, maintaining, cooling, re-heating, maintaining, and cooling.

In addition, after the baking, the method may further include washing and drying the baked positive electrode active material.

In addition, after the above-described operations, the method may further include forming a coating layer inside or outside the positive electrode active material, and the coating layer may be formed by dry coating, wet coating, CVD coating, or ALD coating method.

However, the coating method is not particularly limited as long as it may form a coating layer on part of the positive electrode active material.

With respect to the method for preparing the positive electrode active material, all the descriptions described with respect to the positive electrode active material may be applied. A secondary battery according to an embodiment of the present disclosure includes the positive electrode active material.

The positive electrode active material is as described above, and a binder, a conductive material, and a solvent are not particularly limited as long as they are applicable to positive electrode current collectors of the secondary battery.

The lithium secondary battery may specifically include a positive electrode, a negative electrode positioned opposite the positive electrode, and an electrolyte between the positive electrode and the negative electrode, but embodiments are not particularly limited as long as it may be used as a secondary battery.

Hereinafter, the present invention will be described in more detail through embodiments. It is not to be construed that the scope of the present disclosure is limited by these embodiments.

<Embodiment 1> Preparation of Positive Electrode Active Material

Synthesis

A spherical $Ni_{0.2}Co_{0.1}Mn_{0.7}CO_3$ precursor was synthesized using a co-precipitation method.

In a 90 L reactor, 25 wt % of $NaCO_3$ and 28 wt % of $NH_4OH$ were added to 2.5 M of an aqueous sulfuric acid solution including composite transition metal in which $NiSO_4·6H_2O$, $CoSO_4·7H_2O$, and $MnSO_4·H_2O$ were mixed in a mole ratio of 20:10:70. At this time, a pH in the reactor was maintained in a range of 8.0 to 11.0 and the temperature in a range of 45 to 50° C. In addition, $N_2$, which is an inert gas, was introduced into the reactor so that the prepared precursor was not oxidized. After completion of stirring for synthesizing, washing and dehydration were performed using a filter press (F/P) equipment. Lastly, the dehydrated product was dried at 120° C. for 2 days and filtered through a 75 μm (200 mesh) sieve to obtain a $Ni_{0.2}Co_{0.1}Mn_{0.7}CO_3$ precursor of 4 μm to 20 μm.

Roasting

The prepared precursor was put in a box furnace, a temperature was raised to 550° C. by 2° C. per minute, maintained at 550° C. for 1 to 6 hours, and then furnace-cooled, in an atmosphere of $O_2$ or Air (50 L/min).

Baking

LiOH or $Li_2CO_3$ was weighed so that the roasted precursor had a Li/(Ni+Co+Mn) rate of 1.45, 0.3 mol % of $Nb_2O_5$ was weighed as a flux dopant to induce growth between primary particles, and they were mixed using a manual mixer (MM).

The mixed product was put in a box furnace, a temperature was raised to 900° C. by 2° C. per minute, maintained at 900° C. for 7 to 12 hours, and then furnace-cooled, in an atmosphere of $O_2$ or Air (50 L/min).

A composition of the positive electrode active material prepared in Embodiment 1 was Li:Ni:Co:Mn:Nb=15.3:15.1:9.3:59.8:0.4 wt %.

<Embodiment 2> Preparation of Positive Electrode Active Material

A positive electrode active material was prepared in the same manner as in Embodiment 1, except that 0.6 mol % of $Nb_2O_5$ was mixed as a flux dopant in the baking of Embodiment 1.

A composition of the positive electrode active material prepared in Embodiment 2 was Li:Ni:Co:Mn:Nb=15.0:14.8:9.3:60.0:0.8 wt %.

<Comparative Example 1> Preparation of Positive Electrode Active Material

A positive electrode active material was prepared in the same manner as in Embodiment 1, except that $Nb_2O_5$ was not mixed as a flux dopant in the baking of Embodiment 1.

<Comparative Example 2> Preparation of Positive Electrode Active Material

A positive electrode active material was prepared in the same manner as in Embodiment 2, except that ammonium niobate oxalate ($C_4H_4NNbO_9xH_2O$) was mixed as the flux dopant in the baking of Embodiment 2.

<Experiment Example> SEM Measurement

SEM measurements of the positive electrode active materials prepared in Embodiments and Comparative Examples were carried out, and the results are shown in FIG. 1.

Referring to FIG. 1, it was appreciated that sizes of the primary particles of the positive electrode active materials according to the above Embodiments were increased as compared to the Comparative Examples and that the sizes of the primary particles increased more as an amount of $Nb_2O_5$ added as the flux dopant for inducing the growth between primary particles increases.

In the case of the positive electrode active materials prepared according to Embodiments of the present disclosure, the size of the primary particles was measured to be in a range of 300 nm to 5 μm, and it was appreciated that the primary particles may be adjusted to sub-micron size, rather than conventional nano-sized primary particles.

In the case of Comparative Example 2, 0.6 mol % of the Nb compound was put in the same manner as in Embodiment 2, but since the Nb compound was different, the size of the primary particles was formed smaller than that of Embodiment 1 in which 0.3 mol % of Nb compound was put.

<Experiment Example> Cross-Section SEM Measurement

Figure 2A:
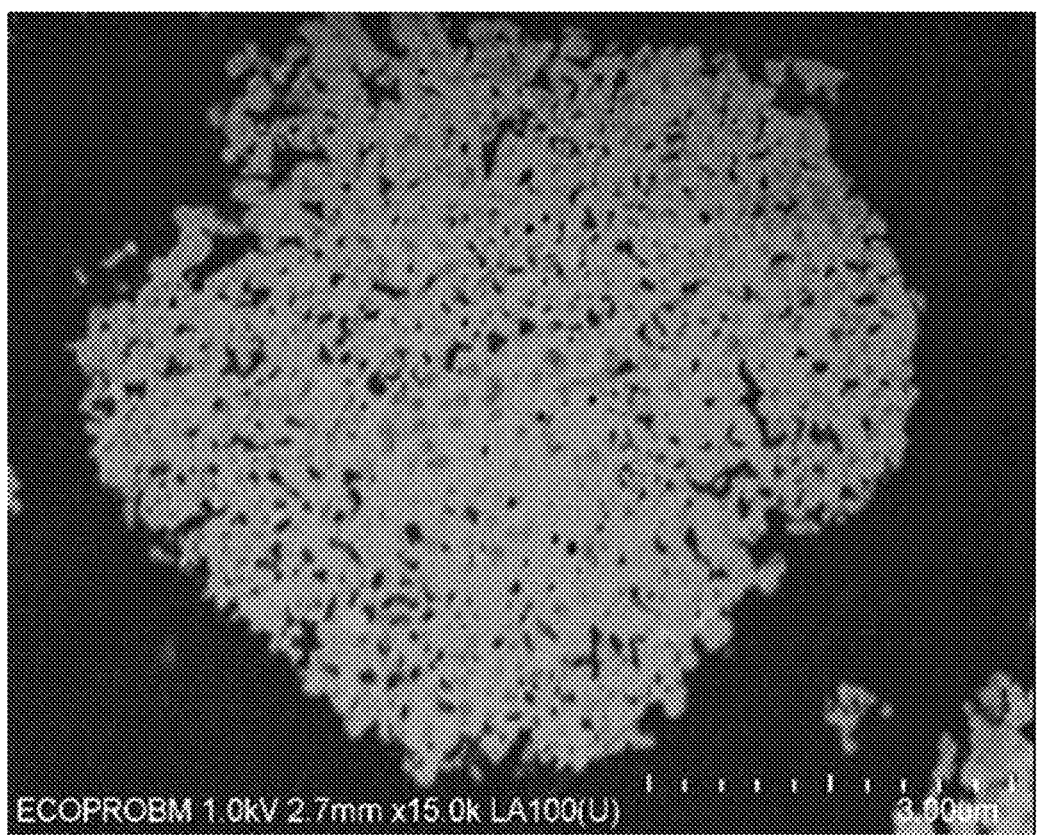
FIGS. 2A and 2B illustrate SEM analysis images of cross-sections of positive electrode active materials according to Comparative Examples and Embodiments.
Figure 2B:
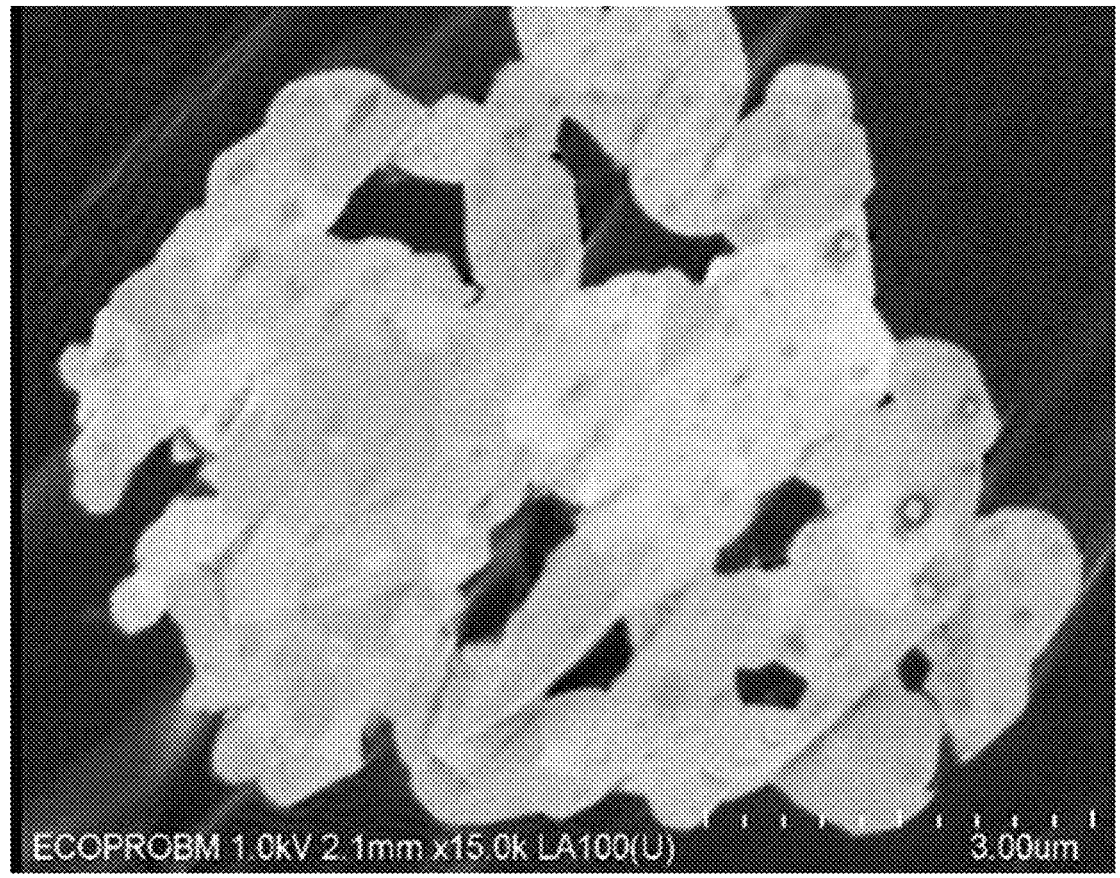

A cross-section SEM measurement was carried out on the positive electrode active materials prepared in the Embodiments and Comparative Examples, and the results are shown in FIGS. 2A and 2B.

FIG. 2A is a cross-section SEM image of the positive electrode active material prepared in Comparative Example 1, showing that not only the primary particles located outside the secondary particles of the positive electrode active material, but also the primary particles located inside the secondary particles were small.

On the other hand, FIG. 2B is a cross-section SEM image of the positive electrode active material prepared in Embodiment 2, showing that not only the primary particles located outside the secondary particles of the positive electrode active material, but also the primary particles located inside the secondary particles of the positive electrode active material were increased in size.

<Experiment Example> EDX Measurement

Figure 3A:
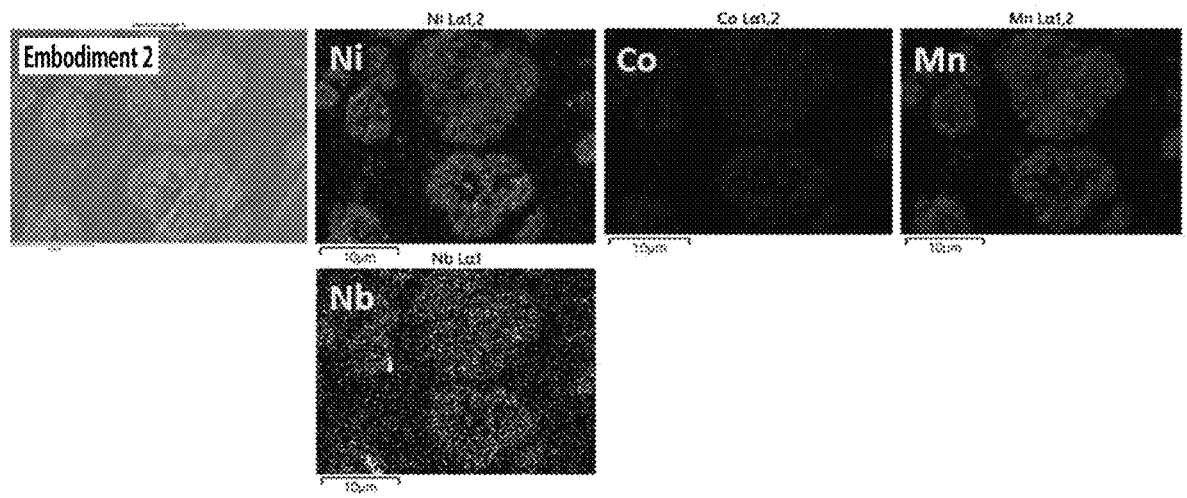
FIGS. 3A and 3B illustrate results of EDX analysis of positive electrode active materials according to Comparative Examples and Embodiments.
Figure 3B:
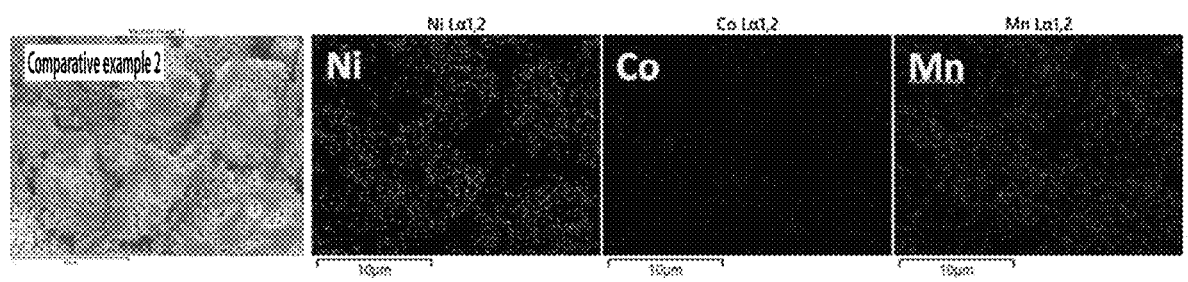

EDX images of the positive electrode active materials prepared in Embodiments and Comparative Examples were measured, and the results are shown in FIGS. 3A and 3B.

FIG. 3A shows the EDX results of the positive electrode active material containing the flux dopant, prepared in Embodiment 2, and it was appreciated that not only Ni, Co, and Mn elements, but also Nb added as the flux dopant for inducing growth of the primary particles were uniformly included in the particles FIG. 3B shows the EDX results of the positive electrode active material without the flux dopant, prepared in Comparative Example 1, and it was appreciated that only Ni, Co, and Mn elements were uniformly included in the particles.

<Experiment Example> XRD Analysis

Figure 4:
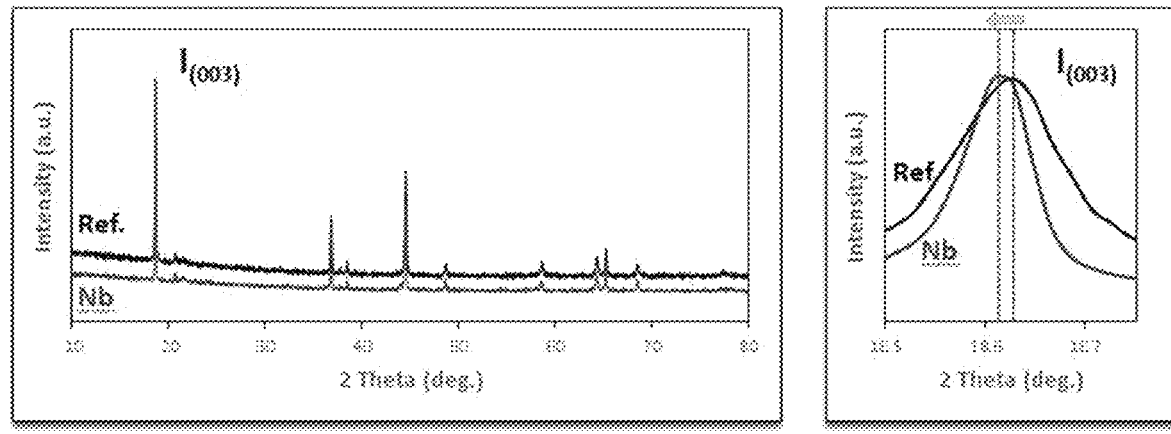
FIGS. 4 and 5 illustrate results of X-ray diffraction (XRD) analysis of positive electrode active materials according to Comparative Examples and Embodiments.
Figure 5:
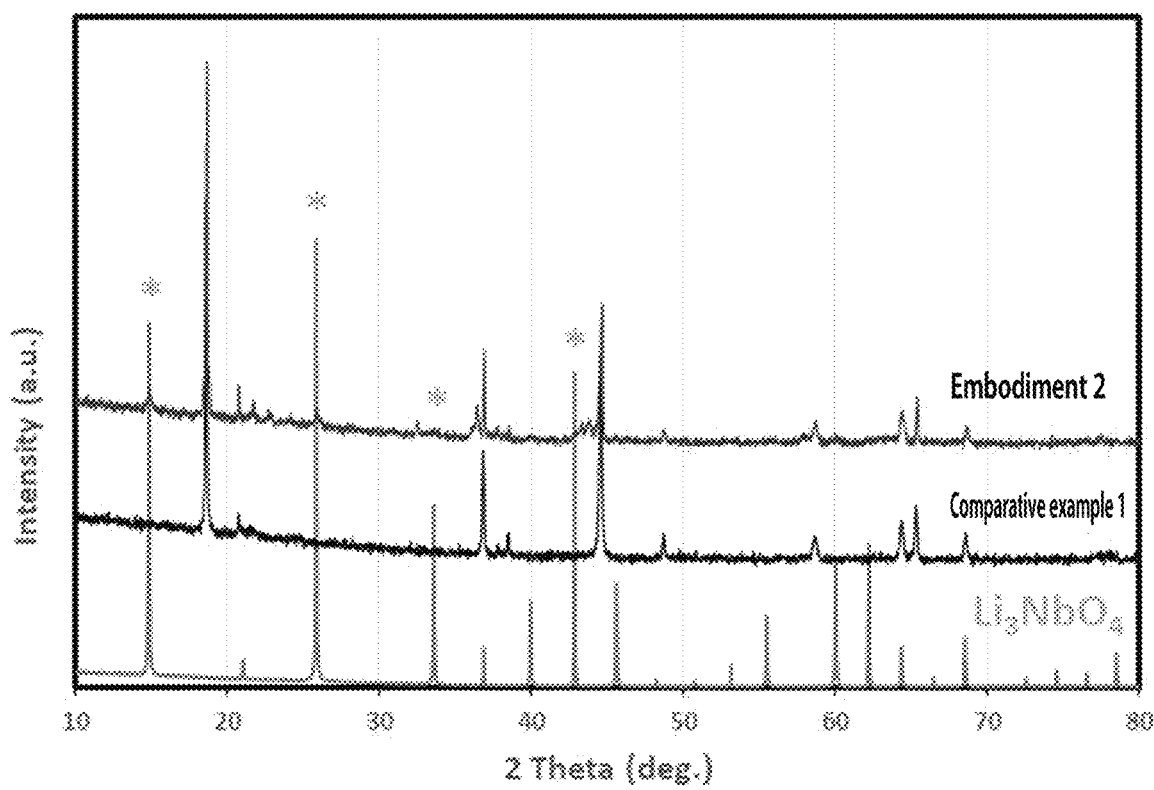
Figure 6:
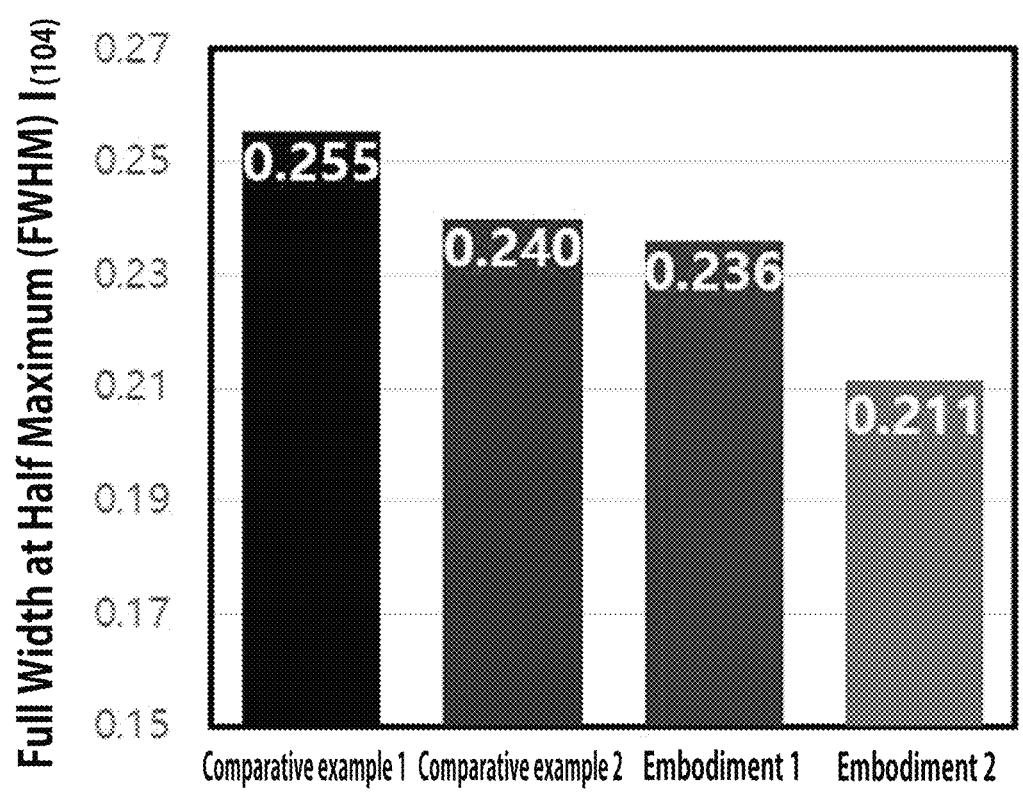
FIG. 6 illustrates a graph comparing measurement results of full width at half maximums (FWHM (deg.)) at I (104) in XRD analysis of positive electrode active materials according to Comparative Examples and Embodiments.

The results of XRD analysis of the positive electrode active material prepared in Embodiments or Comparative Examples are shown in FIGS. 4 to 6. XRD analysis was used at a wavelength of CuKα radiation=1.5406 Å.

In FIG. 4, it was appreciated that when the flux dopant was added, I (003), a major peak of the overlithiated layered oxide, was shifted to a lower angle in the XRD analysis. This may be identified as evidence that the flux dopant, Nb, is doped in an overlithiated layered oxide lattice.

In FIG. 5, it was appreciated that when Nb was mixed according to Embodiment 2 of the present disclosure, a peak due to $Li_3NbO_4$ appeared in the XRD analysis.

In FIG. 6, in the XRD analysis of the positive electrode active materials according to the above Embodiments, it was appreciated that a full width at half maximum (FWHM (deg.)) at I (104) decreased as compared to Comparative Examples, and the FWHM further decreased as an amount of the flux dopant that induces growth between primary particles increases.

More specifically, it was appreciated that the FWHM was reduced by a reduction rate of 7.5% when 0.3 mol % of Nb was added as the flux dopant for inducing the growth between primary particles, and by 17.3% when 0.6 mol % of Nb was added. It was appreciated that, although the baking was performed at the same temperature, the size of the primary particles may be adjusted by adding a dopant, and accordingly, the FWHM at I (104) may be adjusted.

<Experiment Example> Measurement of Packing Density

Figure 7:
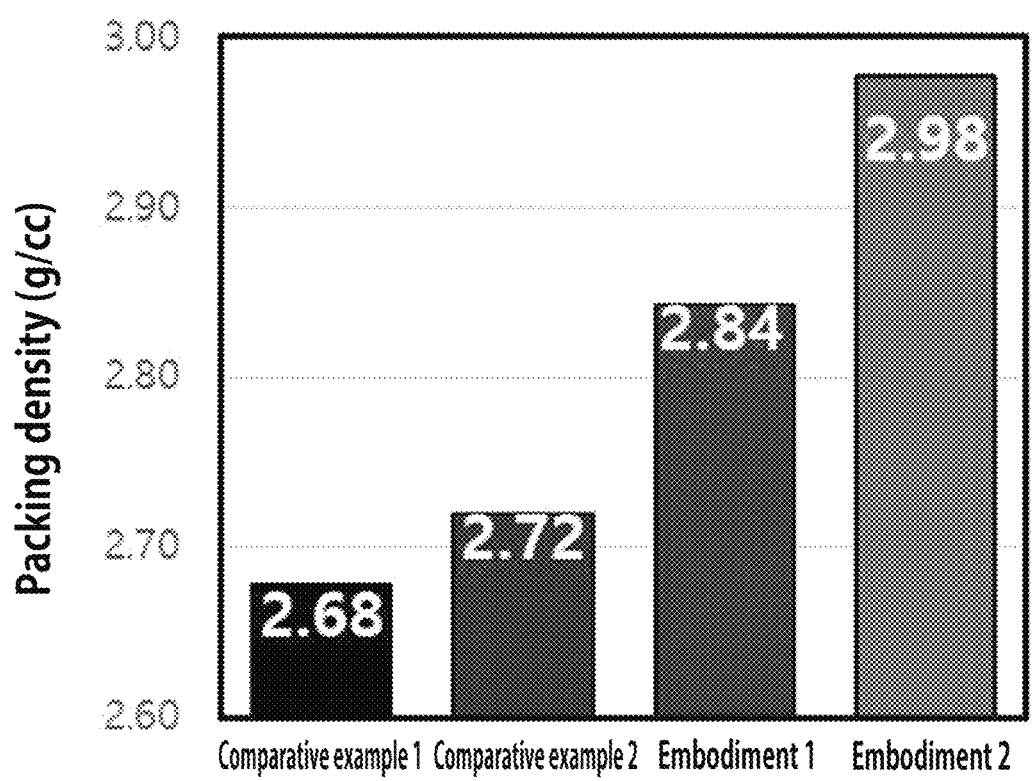
FIG. 7 illustrates a graph comparing packing densities (g/cc) of positive electrode active materials according to Comparative Examples and Embodiments.

Referring to FIG. 7, the packing densities (g/cc) of the positive electrode active materials according to Embodiments increased as compared to Comparative Examples, and the packing density (g/cc) further increased as an amount of the flux dopant increases.

<Experiment Example> BET Measurement

Figure 8:
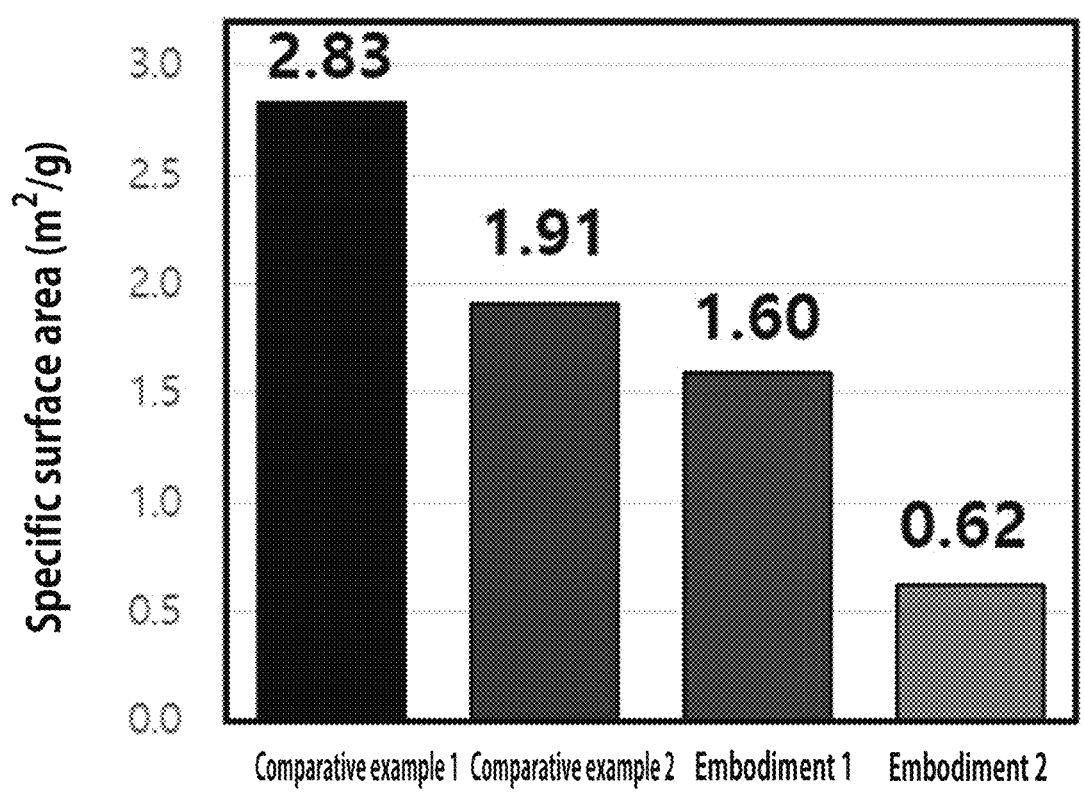
FIG. 8 illustrates a graph comparing specific surface areas (BET, $m^2/g$) of positive electrode active materials according to Comparative Examples and Embodiments.

Referring to FIG. 8, the specific surface areas (BET, $m^2/g$) of the positive electrode active materials according to the above Embodiments were reduced as compared to Comparative Examples, and the specific surface areas (BET, $m^2/g$) further decreased as an amount of the flux dopant increases. More specifically, it was appreciated that when 0.3 mol % of Nb was added as the flux dopant, the specific surface area (BET, $m^2/g$) was reduced by 60%, and when 0.6 mol % was added, the specific surface area (BET, $m^2/g$) was reduced by 80% or more.

<Experiment Example> Measurement of Electrochemical Properties

Figure 9:
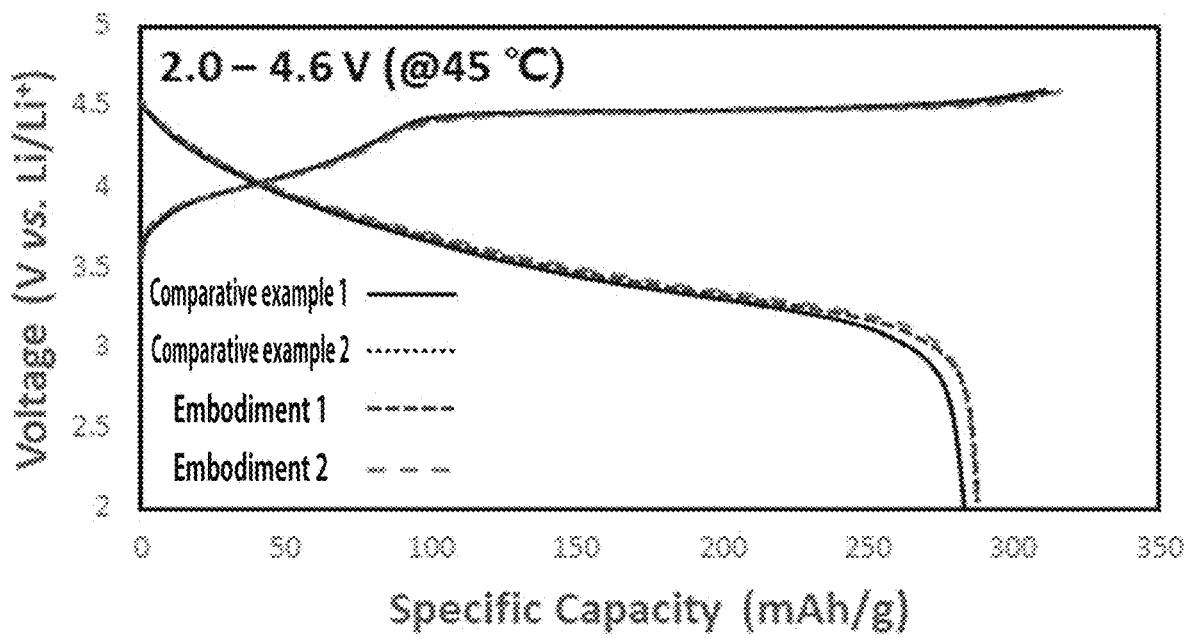
FIG. 9 illustrates a graph comparing initial voltage profiles of positive electrode active materials according to Comparative Examples and Embodiments.

Referring to FIG. 9, it was appreciated that Embodiments in which the flux dopant that induces the growth of the primary particles was added in the baking showed excellent voltage characteristics as compared to Comparative Examples in which the flux dopant were not added. The increase in initial charge/discharge capacity of the positive electrode active material including the overlithiated layered oxide as compared to the Comparative Examples results from an increase in inter-slab due to the flux dopant and from an increase in kinetics of Li-ions because an ion conductor coating layer is present.

Figure 10:
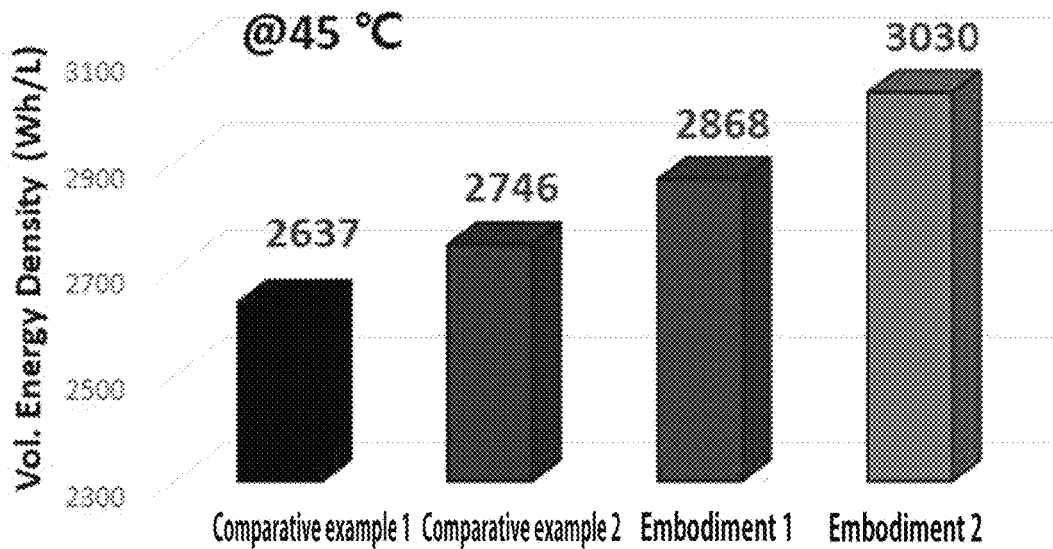
FIG. 10 illustrates a graph comparing energy densities per volume of positive electrode active materials according to Comparative Examples and Embodiments.

Referring to FIG. 10, it was appreciated that the energy density per volume (Wh/L) of the positive electrode active materials according to the above Embodiments increased as compared to the Comparative Examples, and it further increased as an amount of the flux dopant increases. More specifically, it was appreciated that the energy density per volume was adjusted by an increase rate of 9.1% when 0.3 mol % of Nb was added as the flux dopant, and by an increase rate of 14.9% when 0.6 mol % of Nb was added as the flux dopant.

Figure 11:
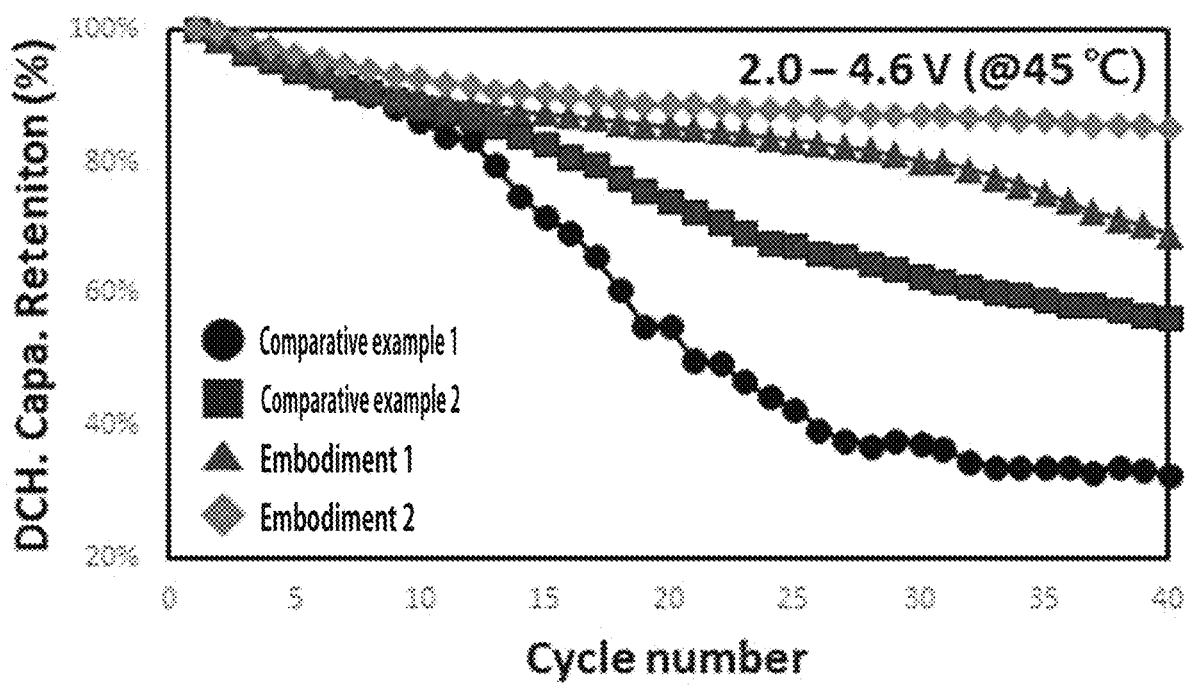
FIG. 11 illustrates a graph comparing capacity retentions according to cycle number of positive electrode active materials according to Comparative Examples and Embodiments.

Referring to FIG. 11, it was appreciated that Embodiments in which the flux dopant was added in the baking showed excellent voltage characteristics as compared to Comparative Examples in which the flux dopant was not added, and capacity retention according to cycle number was further maintained as an amount of the flux dopant increases.

Figure 12:
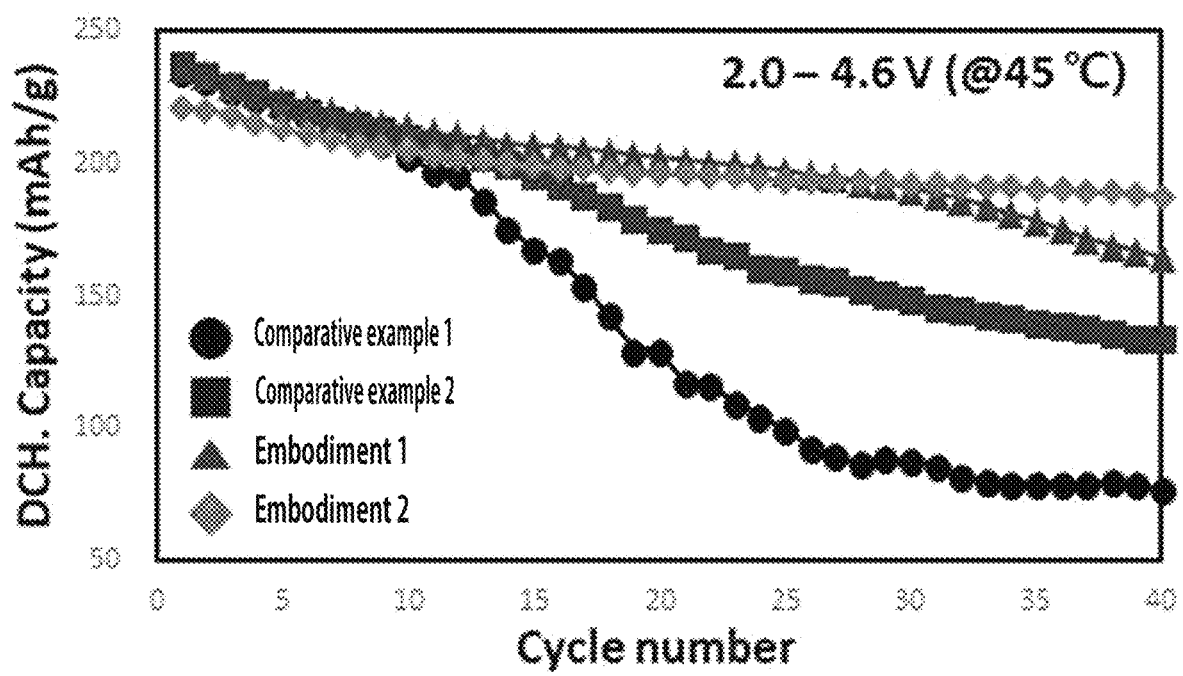
FIG. 12 illustrates a graph comparing capacities according to cycle number of positive electrode active materials according to Comparative Examples and Embodiments.

Referring to FIG. 12, it was appreciated that Embodiments in which the flux dopant was added in the baking showed excellent voltage characteristics as compared to Comparative Examples in which the flux dopant was not added, and capacity according to cycle number was further maintained as an amount of the flux dopant increases.

Figure 13:
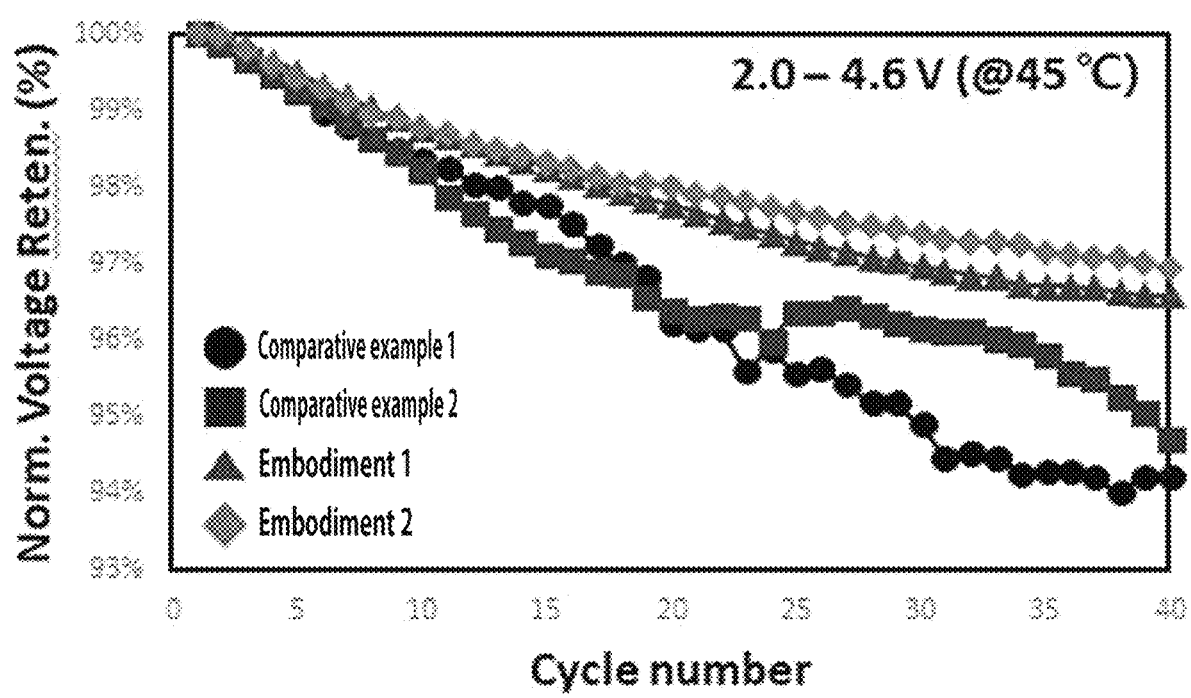
FIG. 13 illustrates a graph comparing voltage retentions according to cycle number of positive electrode active materials according to Comparative Examples and Embodiments.

Referring to FIG. 13, it was appreciated that Embodiments in which the flux dopant was added in the baking showed excellent voltage characteristics as compared to Comparative Examples in which the flux dopant was not added, and voltage retention according to cycle number was further maintained as an amount of the flux dopant increases.

Figure 14:
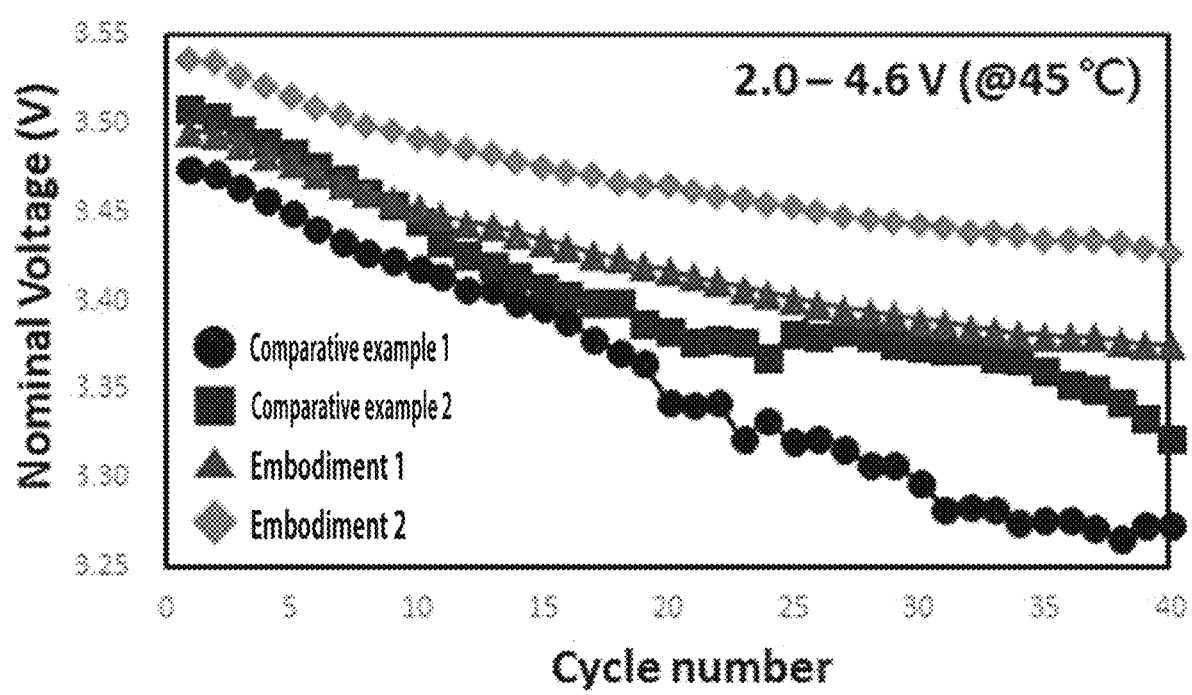
FIG. 14 illustrates a graph comparing nominal voltages according to cycle number of positive electrode active materials according to Comparative Examples and Embodiments.

Referring to FIG. 14, it was appreciated that Embodiments in which the flux dopant was added in the baking showed excellent voltage characteristics as compared to Comparative Examples in which the flux dopant was not added, and nominal voltage according to cycle number was further maintained as an amount of the flux dopant increases.

The experimental results are shown in Table 1 below.

TABLE 1

|  | ITEM |  | Comp. example 1 | Comp. example 2 | Embodiment 1 | Embodiment 2 |
| --- | --- | --- | --- | --- | --- | --- |
| Intial (@45° C.) 0.1 C 2.0-4.6 V | CH. DCH. Eff. | mAh/g % | 311 283 91 | 312 288 92 | 314 288 92 | 317 288 91 |
| Life (@45° C.) 1 C/1 C | Cycle Life (40 cy.) |  | 33 | 57 | 57 | 85 |
| 2.0-4.6 V | Voltage Decay (40 cy.) |  | 94.2 | 94.7 | 94.7 | 96.5 |

The invention claimed is:

1. A positive electrode active material for secondary batteries, the positive electrode active material comprising an overlithiated layered oxide (OLO) represented by the following Chemical Formula 1:

$$rLi_2MnO_3 \cdot (1-r)Li_aNi_xCo_yMn_zM1_{1-(x+y+z)}O_2, \quad \text{Chemical Formula 1}$$

(where $0<r\leq 0.6$, $0<a\leq 1$, $0\leq x\leq 1$, $0\leq y<1$, $0\leq z<1$, $0<x+y+z<1$, and M1 is one or more selected from Ba, Sr, P, Y, Zr, Nb, Mo, Ta, and W)

wherein primary particles are aggregated to form secondary particles, wherein primary particles having a size in a range of 1 μm to 10 μm are 50 to 100% by volume of the primary particles constituting the secondary particles, wherein the OLO represented by Chemical Formula 1 is in a solid solution phase in which $Li_2MnO_3$ having a monoclinic structure and $LiMO_2$ having a rhombohedral structure are mixed, where M is one or more selected from Ni, Co, Mn, and M1, wherein M1 is a dopant material, and wherein the positive electrode active material includes a material represented by the following Chemical Formula 2:

$$Li_aM1O_b, \quad \text{Chemical Formula 2}$$

(where $0<a\leq 7$, $0<b\leq 15$, and M1 is one or more selected from Ba, Sr, P, Y, Zr, Nb, Mo, Ta, and W), and where M1 is included in the OLO represented by Chemical Formula 1 in an amount in a range of from 0.01 mol % to 10 mol %.

2. The positive electrode active material for secondary batteries of claim 1, wherein an average particle diameter of the secondary particles of the positive electrode active material is in a range of 2 μm to about 20 μm.

3. The positive electrode active material for secondary batteries of claim 1, wherein M1 of Chemical Formula 1 is a dopant serving as a flux for growing the primary particles.

4. The positive electrode active material for secondary batteries of claim 1, wherein M1 of Chemical Formula 1 is contained in an amount ranging from 0.001 to 10 mol % with respect to the total number of moles of metal constituting the positive electrode active material.

5. The positive electrode active material for secondary batteries of claim 1, wherein a packing density of the positive electrode active material is in a range of 2.0 to 4.0 g/cc.

6. The positive electrode active material for secondary batteries of claim 1, wherein a specific surface area (BET, m²/g) of the positive electrode active material is in a range of 0.1 to 1.5 (BET, m²/g).

7. The positive electrode active material for secondary batteries of claim 1, wherein a rate (Li/(Ni+Co+Mn)) of the number of moles of lithium to the total number of moles of at least one or more metal selected from Ni, Co and Mn in the overlithiated layered oxide is in a range of 1.1 to 1.6.

8. The positive electrode active material for secondary batteries of claim 1, wherein a rate (Mn/Ni) of the number of moles of Mn to the total number of moles of Ni in the overlithiated layered oxide is in a range of 1 to 4.5.

9. A secondary battery, comprising the positive electrode active material of claim 1.

10. The positive electrode active material for secondary batteries of claim 1, wherein a full width at half maximum (FWHM (deg.)) at I (104), for the positive electrode active material, is in a range of from 0.1 degrees to 0.25 degrees.

* * * * *